(12) United States Patent
Travers et al.

(10) Patent No.: US 10,928,228 B2
(45) Date of Patent: Feb. 23, 2021

(54) SENSOR-BASED BREASTFEEDING VOLUME MEASUREMENT DEVICE

(71) Applicant: COROFLO LIMITED, Dublin (IE)

(72) Inventors: James Travers, Dublin (IE); Helen Barry, Dublin (IE)

(73) Assignee: Coroflo Limited, Dublin (IE)

(*) Notice: Subject to any disclaimer, the term of this patent is extended or adjusted under 35 U.S.C. 154(b) by 0 days.

(21) Appl. No.: 16/317,093

(22) PCT Filed: Jul. 11, 2017

(86) PCT No.: PCT/EP2017/067445
§ 371 (c)(1),
(2) Date: Jan. 11, 2019

(87) PCT Pub. No.: WO2018/011225
PCT Pub. Date: Jan. 18, 2018

(65) Prior Publication Data
US 2019/0250020 A1    Aug. 15, 2019

(30) Foreign Application Priority Data
Jul. 13, 2016    (GB) .................................... 1612179

(51) Int. Cl.
*G01F 1/28*    (2006.01)
*A61J 13/00*    (2006.01)

(52) U.S. Cl.
CPC ............... *G01F 1/28* (2013.01); *A61J 13/00* (2013.01); *A61J 2200/70* (2013.01)

(58) Field of Classification Search
None
See application file for complete search history.

(56) References Cited

U.S. PATENT DOCUMENTS 5,663,508 A * 9/1997 Sparks .................... G01F 1/28
    73/861.71
6,055,869 A * 5/2000 Stemme .................. G01P 5/02
    604/533

(Continued)

FOREIGN PATENT DOCUMENTS

WO    2005016220 A2    2/2005

OTHER PUBLICATIONS

International Search Report for International Application No. PCT/EP2017/067445, dated Oct. 5, 2017.

*Primary Examiner* — Harshad R Patel
(74) *Attorney, Agent, or Firm* — Snell & Wilmer L.L.P.; Kent A. Lembke

(57) ABSTRACT

A nipple-shield mounted sensor with associated electronic interface and interconnect for measurement and display of milk flow and volume during breastfeeding. The sensor is mounted in the tip of the nipple-shield in order to minimise intrusion between mother and child. The dimensions of the sensor and associated cabling are such that the device does not appear substantially different to a nipple-shield alone, thereby having minimal impact on the feeding session. Microlitre flow levels are measured directly by the sensor in order to relay accurate, real-time information on milk volume back to the feeding mother. The electronics unit amplifies the sensor input and digitally processes the data with software algorithms to determine the fluid volume.

21 Claims, 2 Drawing Sheets

(56) References Cited

U.S. PATENT DOCUMENTS

| | | | | |
|---|---|---|---|---|
| 6,408,698 B1* | 6/2002 | Brereton | ................... | G01F 1/20 |
| | | | | 73/841 |
| 7,516,671 B2* | 4/2009 | Liu | ........................ | G01F 1/28 |
| | | | | 73/756 |
| 2002/0156654 A1* | 10/2002 | Roe | ....................... | G06Q 50/24 |
| | | | | 705/3 |
| 2006/0248961 A1* | 11/2006 | Shachar | ............. | G01P 13/0033 |
| | | | | 73/861.24 |
| 2008/0039741 A1 | 2/2008 | Shemesh et al. | | |
| 2008/0077042 A1 | 3/2008 | Feldkamp et al. | | |
| 2009/0155753 A1* | 6/2009 | Ales | ....................... | G09B 19/00 |
| | | | | 434/236 |
| 2012/0302924 A1* | 11/2012 | Cunningham | ......... | A61B 5/228 |
| | | | | 600/590 |
| 2013/0073211 A1* | 3/2013 | Hershkovich | ........... | G01F 22/00 |
| | | | | 702/19 |
| 2014/0142415 A1* | 5/2014 | Cunningham | ......... | A61B 5/038 |
| | | | | 600/407 |
| 2015/0196247 A1* | 7/2015 | Lau | .......................... | G01F 1/34 |
| | | | | 600/301 |

\* cited by examiner

SENSOR-BASED BREASTFEEDING VOLUME MEASUREMENT DEVICE

FIELD

The present invention relates to breastfeeding volume measurement device and in particular to a device that incorporates a sensor that operably provides a flow measurement indicative of a volume of breast milk being produced.

BACKGROUND

Among breastfeeding mothers there is a need for accurate measurement of milk volume delivered to a baby; in the absence of this information many mothers turn to supplementation or give up breastfeeding completely due to concerns over the baby's nourishment. There is significant prior-art in this field and for the purposes of this specification we will classify these known devices into three main groups or categories:

1. Offline indirect. In this first category, a measurement is derived without directly measuring flow or volume; the calculated volume is presented only after the feeding session has completed. The most significant method in this category is pre- and post-measurement of the baby's weight. This is the only method which seems to be currently endorsed by various national health services, but studies have shown it to suffer from very poor accuracy levels.

2. Real-time indirect. Again, in a similar fashion to the first category an inferred or proxy measurement is used to derive delivered milk volume. Approaches which adopt this technique may use of relaying any measurement to the mother in real-time. There are a number of patents and products in this field, mostly centring on measurement of the mother's breast milk volume. Methods employed involve a variety of techniques using for example Doppler flow, skin-conductivity, physical volume, etc. One method not involving a direct breast measurement value relies on an acoustic signature of the baby's swallow in order to derive volume. These methods tend to be extremely complex and instances which have entered the market as a product have omitted accuracy information and generally been poorly received due to reported inaccuracies.

3. Real-time direct. In contrast to the above mentioned categories, this category of device makes use of an actual direct measurement of the milk flow as it passes from mother to baby, with the corresponding volume information being presented in real-time to the mother. Typical embodiments comprise a breast cup with a sensor mounted in or beside a milk channel which then leads to an artificial teat. Many sensor types have been proposed such as piezo-resistive force, thermal gradient, mechanical turbine/reciprocating piston devices. While these devices in some instances are likely more accurate than those categorised in group 1 or 2 above, they also suffer in that they force an artificial separation in distance of the baby from the mother's breast. Based on the sensor configuration, these devices require a significant channel length within which the sensor is arranged. The physical dimensions of the sensor have repercussive effects in that the physical bulk of the sensor, or the required channel length, in each case is such that this extended separation between mother and feeding baby is necessary.

There therefore continues to exist a need for a measurement device that will facilitate an accurate measurement in the volume of breast milk being delivered to a baby.

SUMMARY

These and other problems are addressed in accordance with the present teaching by a device comprising a flexible nipple shield adapted to operably conform in shape with a nipple, the shield defining a flow-channel through which a volume of milk will pass from the nipple to a feeding baby, the device further comprising a flow sensor provided within the nipple shield and comprising a flexible member which is mounted within the flow channel and transverse to a direction of the milk flow, the flexible member being fixed at a first end proximal to the side walls of the flow channel and having a second free end that projects inwardly into the flow channel transverse to the side walls and being moveable in response to movement of the milk through the flow channel in a direction concurrent with the direction of the milk flow, the movement providing an indication of milk flow within the channel.

In accordance with the present teaching, such a device provides a real-time direct measurement of the milk volume being delivered to the baby while at the same time addresses separation issue problems associated with the prior art by minimising the physical size and flow-channel length of the sensor.

Accordingly there is provided a device as detailed in the claims that follow.

DETAILED DESCRIPTION OF THE DRAWINGS

Figure 1:
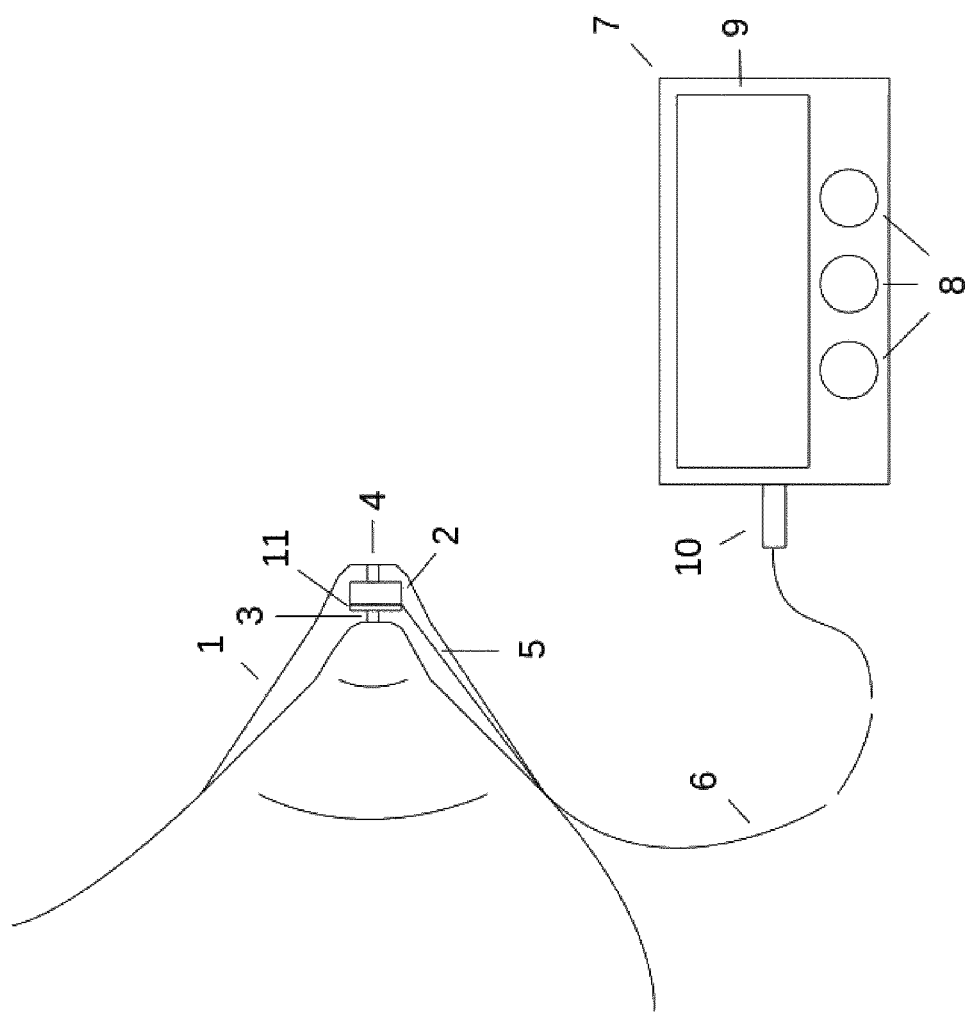
FIG. 1 is a schematic representations of a device in accordance with the present teaching located on a breast and coupled a measurement system.

Referring to FIG. 1 there is provided a device comprising a nipple shield/nipple guard (1) made of silicone rubber or similar elastomeric material. It will be appreciated that the nature of this material imparts flexibility into the shield. The shield is formed of a material that will operably conform to the shape of a woman's nipple. The device further comprises a sensor module (2) which is located in a flow channel defined in the shield. The flow channel comprises an input port (3) and an output port (4) and the flow channel provides a fluid communication path between the two. The sensor module is orientated within the flow channel so as to extend transverse to direction of flow of the milk from the input port (3) to the output port (4).

The input port (3) is in communication with, and typically in intimate contact with, the nipple and, in a breastfeeding situation, receives milk which is delivered into the flow channel and passes by the sensor module (2) prior to exiting from the outlet port (4). The milk passes the sensor module and is delivered to the output channel (4) which is in communication with the baby's mouth so as facilitate the delivery of the milk from the mother to the baby. The suckling motion of the baby is communicated via the flexible nature of the nipple shield to effect an induced flow of milk through the flow channel.

The sensor module (2) desirably comprises a strain gauge sensor mounted on a flexible member transverse to the flow of milk through the flow channel. The flow initiates a drag force on the flexible member which translates to a measurable strain on the gauge. Similarly to known strain gauges, the present teaching uses the change in resistance of a conducting substance as it deforms due to strain as the measurable effect. By incorporating a plurality of individual gauges which collectively define the strain gauge sensor, the gauges can be arranged in a Wheatstone bridge configuration to amplify the overall sensitivity of the strain gauge sensor. It will be understood that the response characteristic of a strain gauge is typically determined as ratio of fractional change in electrical resistance to a fractional change in length or strain. As the measurement is one of a change in resistance, the arrangement of a plurality of individual strain gauges as arms in a Wheatstone bridge can be used to accentuate the sensitivity of the overall sensor. As will be appreciated by those of ordinary skill, the three types of strain gage configurations, quarter-, half-, and full-bridge, are determined by the number of active elements in the Wheatstone bridge, the orientation of the strain gages, and the type of strain being measured. Using these type of configurations, the strain gauge sensor may be provided with from one to four arms of a Wheatstone bridge configuration (corresponding to quarter to full-bridge). The output of the bridge will provide an accurate measure of the induced strain on the gauge, which can be directly attributed to the flow passed the sensor and hence a measure of the milk volume traversing through the device.

Electrical signals from the sensor are communicated from the shield via a flat-flexible-cable (FFC) (5) which can be embedded in the material of the shield. By using a flat profile cable which can be embedded in the material of the shield, the profile of the shield can be minimised. The cable desirably emerges radially from the shield at a lower position on the breast and connects to a processing module or processing unit (7) via an extension to the flat cable or a connection to a round cable (6). The processing module will typically incorporate a user interface comprising buttons (8) or similar type of user interface elements and a display (9) which may be LCD, LED, or other appropriate types. The module includes suitable electronic hardware and/or software that provides for amplification of the signal, digitisation and algorithmic processing to allow for an accurate display of milk volume to be presented to the mother in real time. In certain aspects the functionality of the processing unit may be provided by a smartphone, i.e. a mobile telecommunication device that performs many of the functions of a computer, typically having a touchscreen interface, Internet access, and an operating system capable of running downloaded applications or apps. By providing a software application or app that can be downloaded and then executed on the smartphone, the processing functionality to allow for an accurate display of milk volume to be presented to the mother in real time can be effected using the hardware already present on the smartphone. In this way, where the term processing unit is herein described it will be appreciated that this can be considered a smartphone executing dedicated software that is provided separately to the phone. The executable app will typically be provided through separate trade channels to the actual nipple shield—for example it will be accessed through an IOS or ANDROID app store, as will be appreciated by those of ordinary skill.

To facilitate a decoupling of the nipple shield and associated cabling from the processing unit, there may be provided, between the sensor and the processing module, a connector attached to the shield cable (10). This may incorporate further electronics such as a memory device for storing sensor calibration as well as historical feeding records. In this way a shield may include dedicated electronics and/or memory that will facilitate a personalisation of a specific shield. It will be appreciated that accuracy of the measurement may require calibration and by having a memory associated with each device it is possible to uniquely provide and store individual calibration routines for specific devices. Such a memory could also be used to store historical logged data indicative of actual measurements take using the sensor. This could allow use of the device separate to the processing unit. On a re-coupling of the connector to the processing unit (7) measurements that were taken during the "offline" period could be relayed to the processing unit (7) and the information displayed to the user.

Per the present teaching, by incorporating a memory on the shield side of the system as opposed to relying on a memory incorporated solely in the processing unit, the present teaching facilitates record storage on the shield itself. As detailed above, this facilitates a personalisation of the shield, while the processing module may be generic in nature allowing for connection to multiple sensors provided on different shields. Further to this a data-logging module may be provided which has the capability of reading off and collating feed information against personal or other data for recording in e.g. a maternity hospital situation.

It will be appreciated that such a memory element may be used for storing calibration coefficients of the flow sensor. Other uses would include storage of historical feeding data or sensor wear and/or use information. In this latter application, the device could be configured to provide a visual indicator of actual usage and then provide the user with information regarding possible need to change the sensor module. The sensor module could be provided as a removable or replaceable component and could for example be provided as a component of a feeding brassiere. Such a brassiere could be arranged to receive a first and second sensor module which provide an indication of milk volumes generated in each of a left and right breast respectively. In this way, the volume of milk from each breast can be individually detected and tracked for data logging and review purposes.

In certain arrangements the sensor module is coupled directly to the processing unit using a direct cable extending from the nipple shield. To allow flexibility and avoid the need to always be physically connected to the processing unit, the cable could have embedded therein or have coupled thereto the memory element which advantageously allows for storage of data during periods of non-connection to the processing unit. This would facilitate use of the sensor module without requiring physical connection to the processing and provides a more portable sensor arrangement.

Other configurations that could be employed to avoid direct physical coupling at all times include the use of a transmitter or transmitter/receiver arrangement to facilitate wireless communication between the sensor module and the processing unit. This transmission could use any one of a number of protocols such as for example at least one of WiFi™, Bluetooth™ or ZigBee™ protocols to communicate with a remote device.

In this way it will be appreciated that an overall measurement system provided in accordance with the present teaching includes a processing unit and a separate sensor module, the processing unit configured to receive flow sensor data from the sensor module and provide a visual indication of the flow measured. The processing unit may desirably incorporate a data-logger configured to collate received flow sensor data with at least one of personal information, time-of-day, medical notes.

The actual physical form of the processing unit may vary. For example, the processing unit may be integrated into a wrist unit to be worn during feeding.

The actual processing of the data recorded may include storage of historical feeding records for subsequent retrieval and display in a numeric or graphical fashion. This may allow individual election of a measurement from one of a left or right breast to facilitate independent tracking of milk flow from each breast independently. A visual display may provide a graphical representation of pulsations of milk flow such as in the form of a bar-graph, a dial, or the appropriate percentage of the display becoming inverse in response to a dynamic reading sensed. Such a data processing may be configured to provide real-time accuracy bounds of a given measurement in a numeric or graphical fashion and could be arranged to track usage of the device and provide an indication of when actual usage approaches pre-calibrated expected usage.

Figure 2:
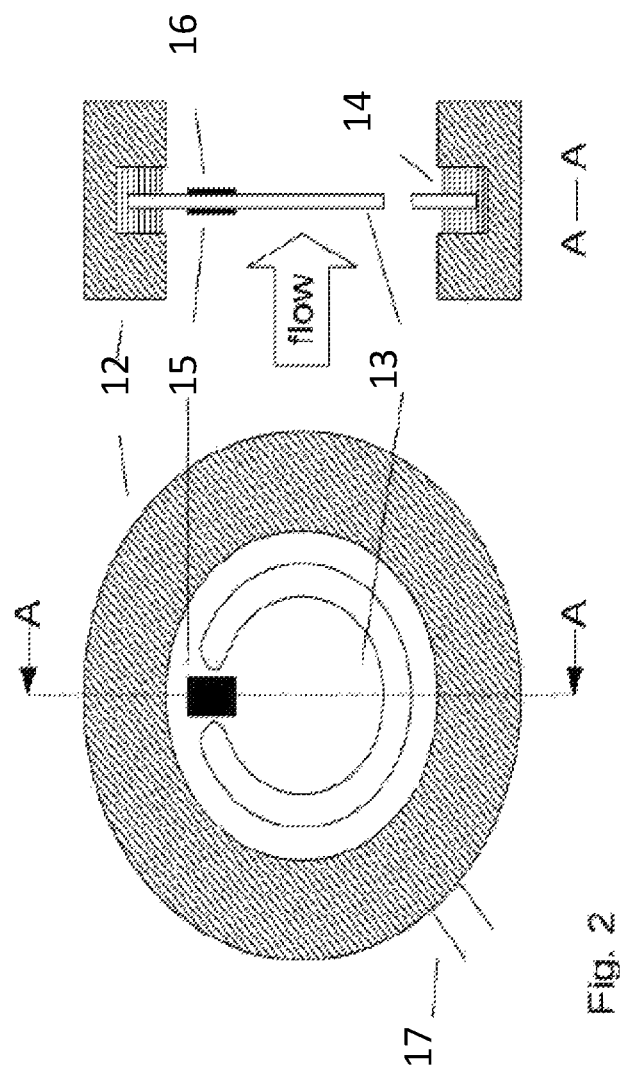
FIG. 2 is a schematic detail in plan and section view of the device of FIG. 1.

The construction of the sensor module may resemble that of the schematic representation shown in FIG. 2. Given the very small flow measurements being taken, the strain gauge elements of the sensor will advantageously be shielded or isolated from the effects of external forces such as mechanical deformation of the bulk body of the sensor module. To facilitate this the device may incorporate a support member (12) such as provided in this exemplary arrangement by an annular section (12) composed of a hard material such as stainless steel. The flexible member (13) of the module is fixed within the sensor body using appropriate adhesive (14) or mechanical clamping means. By locating the flexible member within the confines of the support member external forces outside the channel within which the milk travels are not communicated onto the flexible member and therefore not sensed by the strain gauge elements (15,16) which are located on this flexible member at a position which confers the greatest mechanical advantage from the member (13) to the gauge elements (15,16). In this exemplary arrangement, the figure shows an arrangement of two strain gauge sensor elements (15,16) disposed in corresponding positions on either side of the flexible member (13), and electrically in a half-bridge arrangement. The elements (15,16) extend longitudinally in a direction parallel to a major axis of the flexible member (13), which is a direction substantially transverse to the direction of flow through the channel. This arrangement of a plurality of elements on the same flexible member gives the advantage of compensating vertical loading, material creep and temperature; as well as doubling the signal due to measurement of both compressive and tensile strain. It will be appreciated that additional elements may also be incorporated dependent on the desired sensitivity of the sensor module. The signals from the gauge elements may be conveyed along wires in the bonded section of the flexible material (not shown) and exited from the sensor module at a location convenient to the design of the unit (17).

The opening of the sensor may require physical shielding and to this end a disk 11, formed of appropriate material, e.g. polypropylene, may be fixed over the opening. In addition, nozzles can be introduced into this disk in order to allow for the flow of milk. It may be the case that some degree of flow conditioning is required at the input to the sensor body and the nozzles may be arranged to satisfy this function. If the flow should be directed at a particular part of the sensor then the nozzle arrangement may accommodate this; alternatively a requirement for turbulent flow would be met by incorporating a turbulator into this component.

Due to the sensitivity requirement to very low flow rates (upper µl/s to lower ml/s range) both mechanical and electrical amplification of the drag force may be required. In FIG. 2 the flexible member forms a paddle shape such that the round section deforms minimally but confers most of the force to the neck where the gauge is sited. Further measures such as combinations or laminates of materials of different elastic modulus may be used to a similar end. It must be noted that the metal of the gauge may become structurally significant in this range, so smaller gauges are preferred which will have thinner film layers to achieve the same electrical resistance. Additionally, the mass of the member itself must be kept to a minimum in order to avoid sensing physical movement as well as flow. Appropriate materials therefore would have a high ratio of Young's modulus to density (high specific modulus) such as Aluminium, or higher modulus/low thermal coefficient plastics such as Mylar™. In the simplest case, the material used to form the strain gauge substrate such as polyimide could form the flexible member, with the metal film of the gauge and its contacts optionally being employed to form support members. It will be appreciated that polyimide advantageously combines properties of flexibility with the capacity that it can be printed with conductive, semi-conductive and resistive inks to integrate the strain gauge elements thereon. Other forms of fabricating the strain gauge elements that may advantageously be employed include applying metal of the gauge as a foil as opposed to a printing/deposition process. Such foils would typically have a thickness of the order of 5 micrometre, with the result that the ultimate sensor formed can be considered as a microsensor—having dimensions of the order of microns.

It will be further appreciated that a particular advantage of using polyimide, such as that sold under the trade mark Kapton™ as a backing material for the metal material in formation of the strain gauge, is its coefficient of thermal expansion closely matches that of typical gauge metals (e.g. Constantan, which is a copper-nickel alloy) and its inherent dimensional stability. This option is advantageous from both a mass and stiffness point of view due to the relatively high sectional modulus of this type of structure.

If manufacturing methods allow, all or some of the gauge, flexible member, support member, and flat-flexible-cable may be combined into a single unit enabling the simplification of the device and its assembly. The shield unit would be required to allow only approved food-grade materials to contact the milk flow channel. Where other materials were required these would need to be encapsulated in a food-grade material such as silicone or PTFE (Teflon™). Other substances for which concerns have been raised in the area of baby feeding, for example bisphenol-A, should also be excluded irrespective of their approval status.

In use, the shield will be located on the breast and the power/communication cables coupled to the processing unit 7.

1. The unit is powered up and the sensor settles on a baseline value within a certain warm-up time. This will be a value with no fluid present in the channel which will be expected to be different to the zero-flow value with milk present due to temperature, convection, etc. For the purposes of explanation, this value could hypothetically be attributed a value of 100.

2. The feeding session starts and the first and subsequent pulses increase as a result of the sensed milk flow within the channel. The output values would increase relative to the zero value above, for example to a value of 1000. It will be appreciated that the output of the sensor gauges will be a series of pulsed values responsive to the induced milk flow resultant from the suckling child. Between each maximum pulse value, the values sensed do not fully settle back to the initial value though due to the time-constant of the sensor or residual flow between the pulses. The peak-to-peak value for these pulses is assumed therefore to be 900 and a corresponding volume is displayed.

3. It is characteristic of a feeding session that relatively long periods have no milk expression. When the first of these is encountered the output settles back to a steady value of 200 indicating the zero-flow value with milk present. It is now clear that the value for the initial pulses peaked at 800 instead of 900, so the volume may be re-calculated based on algorithmic computations effected within the processing unit 7.

4. It will be appreciated that displaying the recalculated value instantaneously may result in the displayed volume reducing which would seem erroneous and could cause concern. As a result the unit 7 may delay providing a visual indication of the first measurement value until additional data is processed. Other arrangements would include providing an indication of increase in accuracy over time or a measurement lock type symbol on the display so as to provide the user with visibility as to the accuracy being provided.

It will be understood that the heretofore described nipple-shield mounted sensor with associated electronic interface and interconnect advantageously allows for measurement and display of milk flow and volume during breastfeeding. The sensor is mounted in the tip of the nipple-shield in order to minimise intrusion between mother and child. The dimensions of the sensor and associated cabling are such that the device does not appear substantially different to a nipple-shield alone, thereby having minimal impact on the feeding session. Microlitre flow levels are measured directly by the sensor in order to relay accurate, real-time information on milk volume back to the feeding mother. The electronics unit amplifies the sensor input and digitally processes the data with software algorithms to determine the fluid volume. It will be appreciated that the examples of such a measurement device that provides real time measurement values indicative of a milk flow from a mother to her baby are provided to assist in an understanding of the present teaching. While specifics have been described, it will be appreciated that modifications can be made without departing from the scope of the invention.

The words comprises/comprising when used in this specification are to specify the presence of stated features, integers, steps or components but does not preclude the presence or addition of one or more other features, integers, steps, components or groups thereof.

The invention claimed is:

1. A breastfeeding milk flow and volume measurement device comprising a flexible nipple shield adapted to operably conform in shape with a nipple, the shield defining a single flow-channel through which a volume of milk will pass from an inlet at the nipple to an outlet and pass to a feeding baby, the device being configured to measure a total volume of milk passing through the single flow channel, the device further comprising a flow sensor provided within the nipple shield and comprising a strain gauge mounted to a flexible member that operatively deforms minimally in response to an applied force but confers the force to a neck section of the flexible member where the strain gauge is sited, deformation of the flexible member effecting a change in sensed resistance of the strain gauge, the flexible member being mounted within, and extending across, to cover a major portion of the single flow channel and transverse to a direction of the milk flow, the flexible member being fixed at a first end proximal to the side walls of the flow channel and having a second free end that projects inwardly into the flow channel transverse to the side walls and being moveable in response to movement of the milk through the flow channel in a direction concurrent with the direction of the milk flow, the movement providing an indication of milk flow and volume within the channel.

2. The device of claim 1 comprising a support member, the flexible member being cantilevered relative to the support member.

3. The device of claim 1 wherein the strain gauge comprises a plurality of strain gauge elements provided in a bridge arrangement, the strain gauge elements being responsive to movement of the flexible member to output a signal indicative of the flow of milk through the flow channel.

4. The device of claim 3 wherein individual strain gauge elements are provided on opposing sides of the flexible member to monitor the effect of tensile and compressive forces applied to the flexible member in response to its movement within the flow.

5. The device of claim 1 where the strain gauge comprises a semiconductor/piezoresistor type strain gauge.

6. The device of claim 1 wherein the flow sensor is fabricated from a carbon nanotube or is a Micro-Electro-Mechanical Systems, MEMS, type device.

7. The device of claim 1 wherein the strain gauge comprises a piezo film element.

8. The device of claim 1 where the flow sensor comprises a flexible substrate comprising polyimide.

9. The device of claim 1 comprising a memory element for storing one of: calibration coefficients of the flow sensor, historical feeding data, sensor wear and/or use information.

10. The device of claim 9 comprising a cable extending from the nipple shield and wherein the memory element is located on or embedded in the cable.

11. The device of claim 1 comprising a transmitter.

12. The device of claim 11 wherein the transmitter uses at least one of WiFi™, Bluetooth™ or ZigBee™ protocols to communicate with a remote device.

13. A breastfeeding milk flow and volume measurement system comprising a processing unit, a visual display, and the breastfeeding milk flow measurement device of claim 1
  wherein the processing unit is configured to receive flow sensor data from the breastfeeding milk flow measurement device and provide, in the visual display, a visual indication of the flow and volume measured.

14. The system of claim 13 comprising a data-logger configured to collate received flow sensor data with at least one of personal information, time-of-day, medical notes.

15. The system of claim 13 wherein the processing unit is integrated into a wrist unit to be worn during feeding.

16. The system of claim 13 configured to provide storage of historical feeding records for subsequent retrieval and display in a numeric or graphical fashion.

17. The system of claim 13 configured to allow individual election of a measurement from one of a left or right breast to facilitate independent tracking of milk flow from each breast independently.

18. The system of claim 13 wherein the visual display provides a graphical representation of pulsations of milk flow.

19. The system of claim 13 wherein the processing unit is configured to provide real-time accuracy bounds of a given measurement in a numeric or graphical fashion, the real-time accuracy bounds being displayed on the visual display.

20. The system of claim 13 configured to track usage of the device and provide an indication of when actual usage approaches pre-calibrated expected usage.

21. The system of claim 13 wherein the processing unit is a smartphone, the visual display being a screen of the smartphone, the smartphone having executing thereon application software that receives and processes flow sensor data from the sensor and provides, in the visual display, a visual indication of the flow measured.

* * * * *